Oct. 11, 1949.　　　G. L. WEISER ET AL　　　2,484,600
APPARATUS FOR COVERING ELECTRICAL COILS
Filed Oct. 29, 1948　　　9 Sheets-Sheet 1
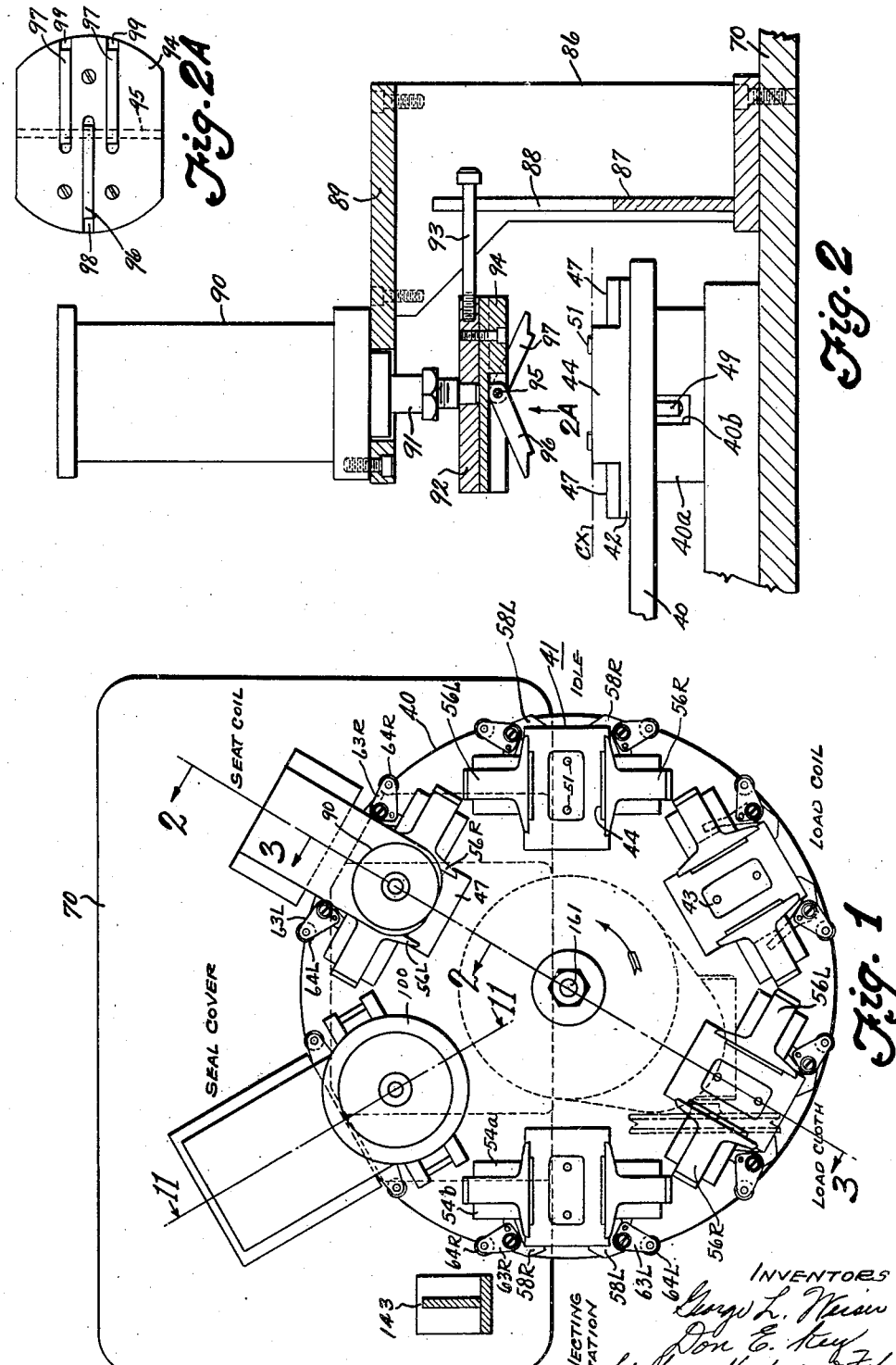

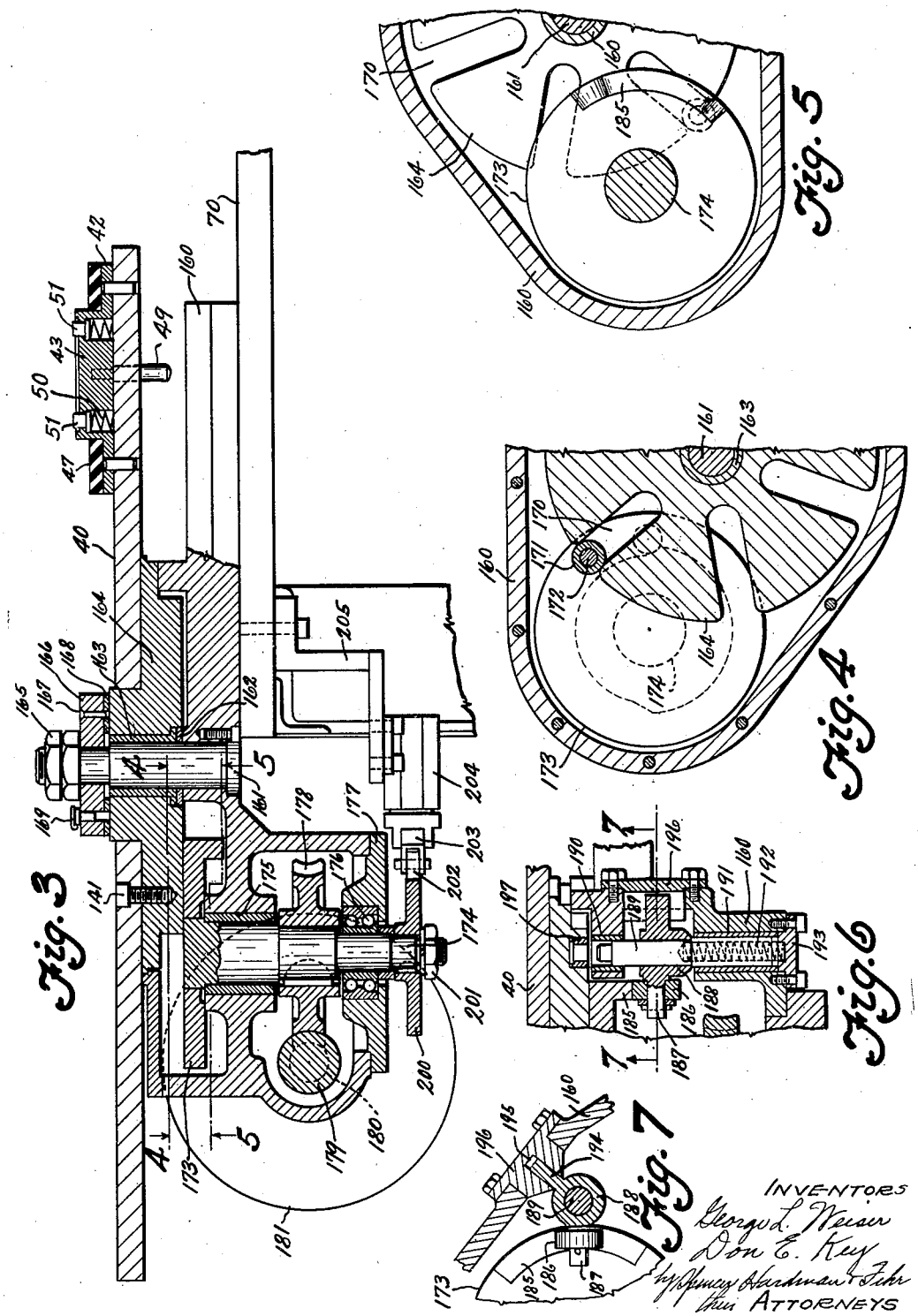

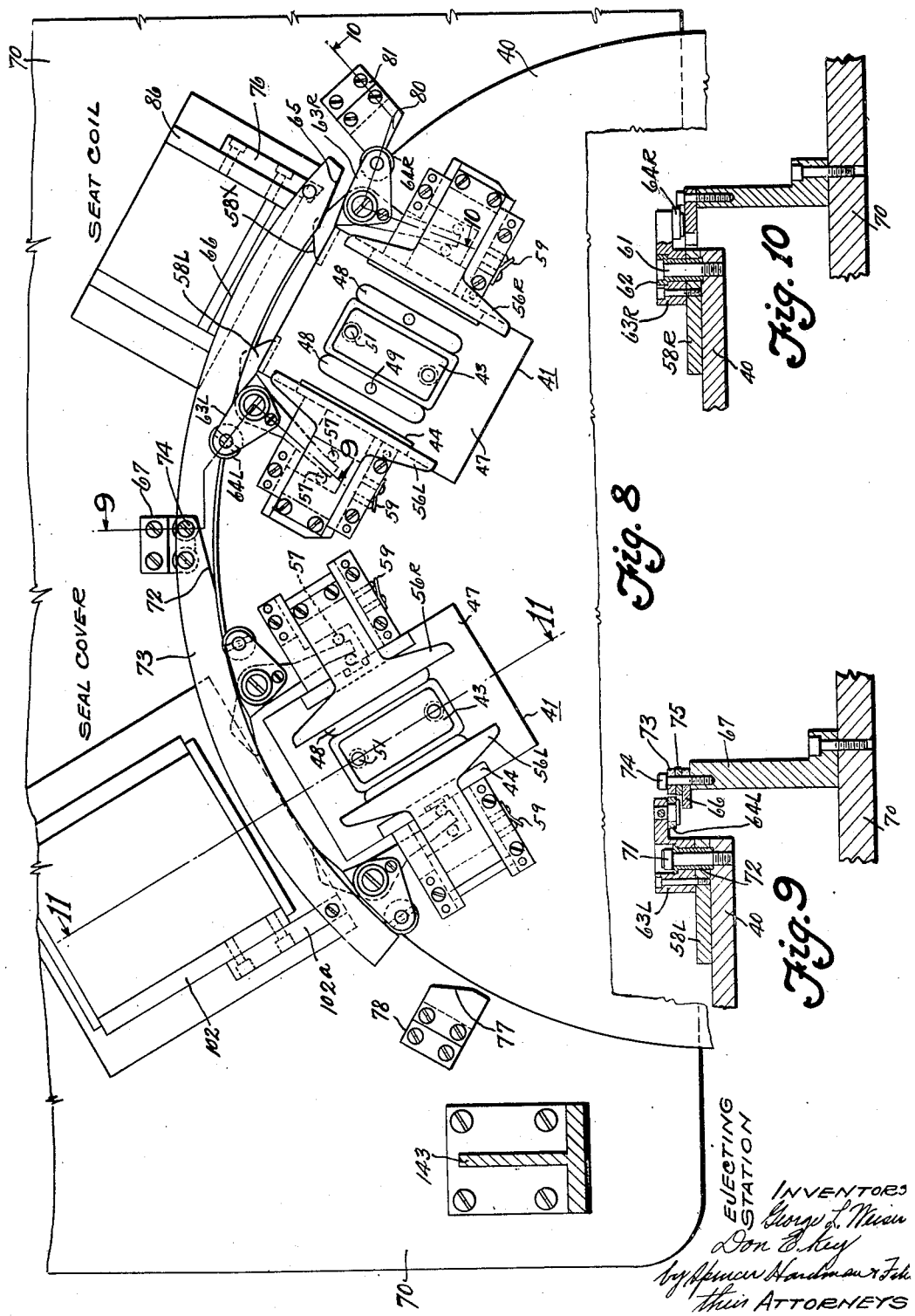

Oct. 11, 1949.    G. L. WEISER ET AL    2,484,600
APPARATUS FOR COVERING ELECTRICAL COILS
Filed Oct. 29, 1948    9 Sheets-Sheet 4

INVENTORS
George L. Weiser
Don E. Key
by Spencer Hardman & Fehr
their ATTORNEYS

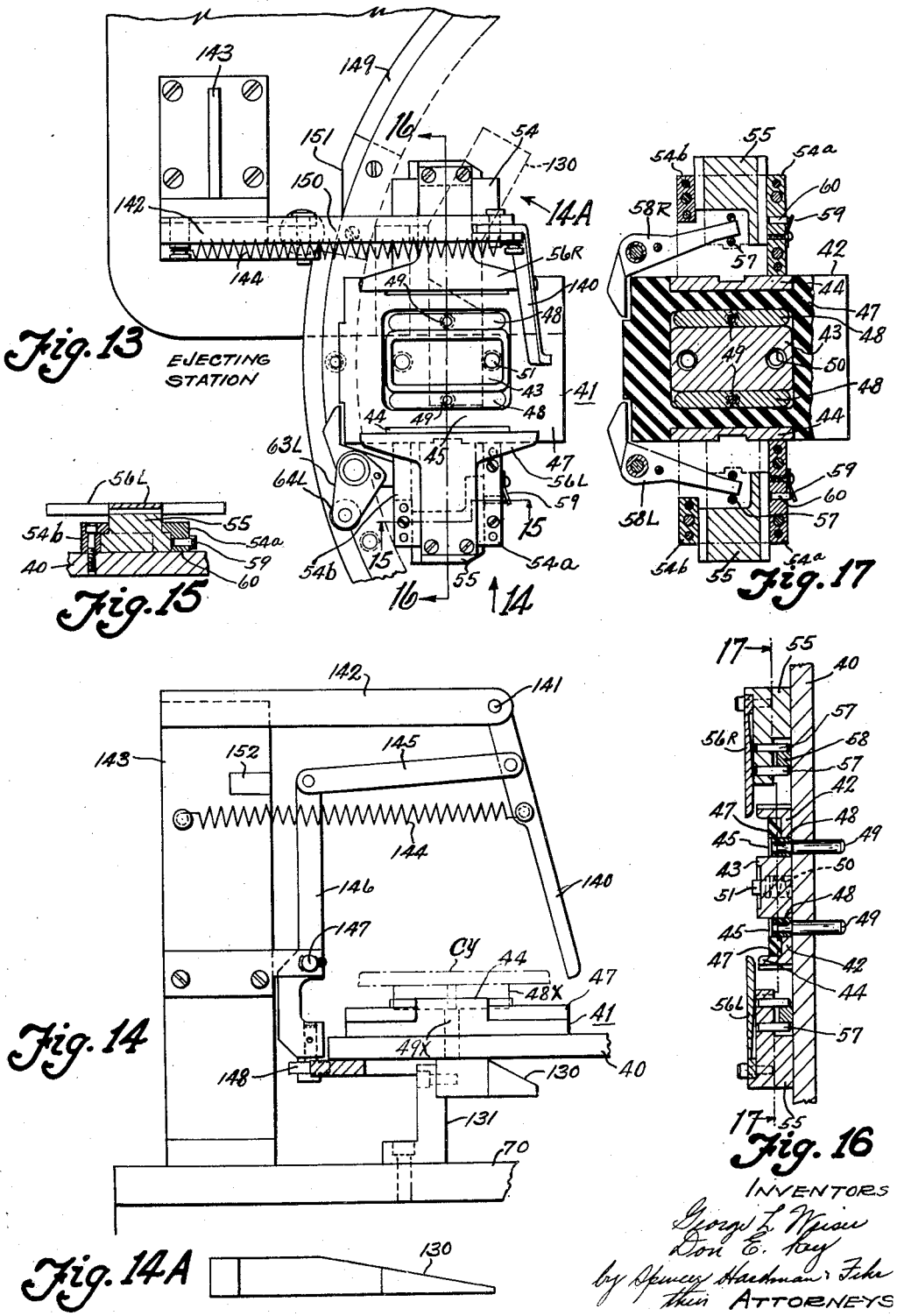

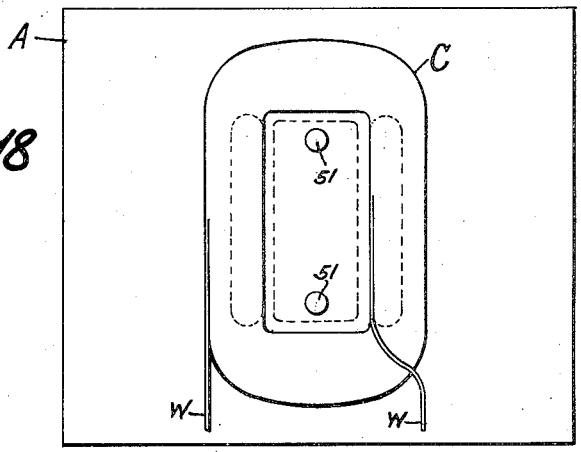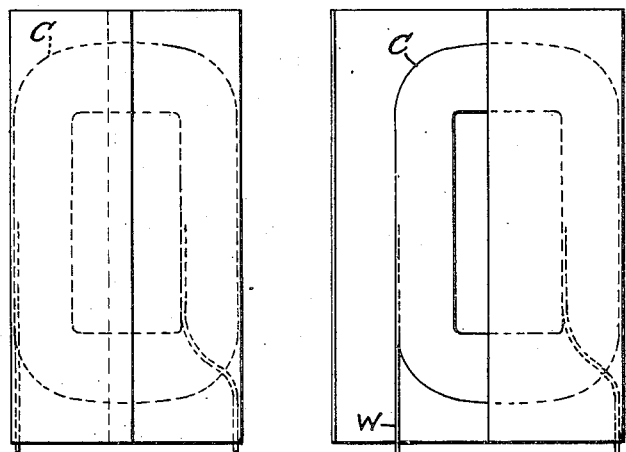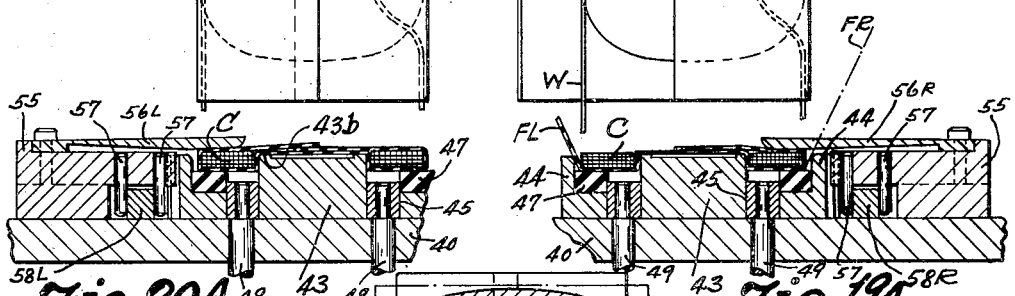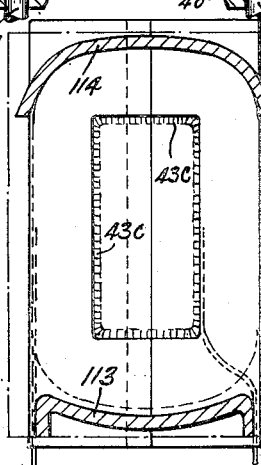

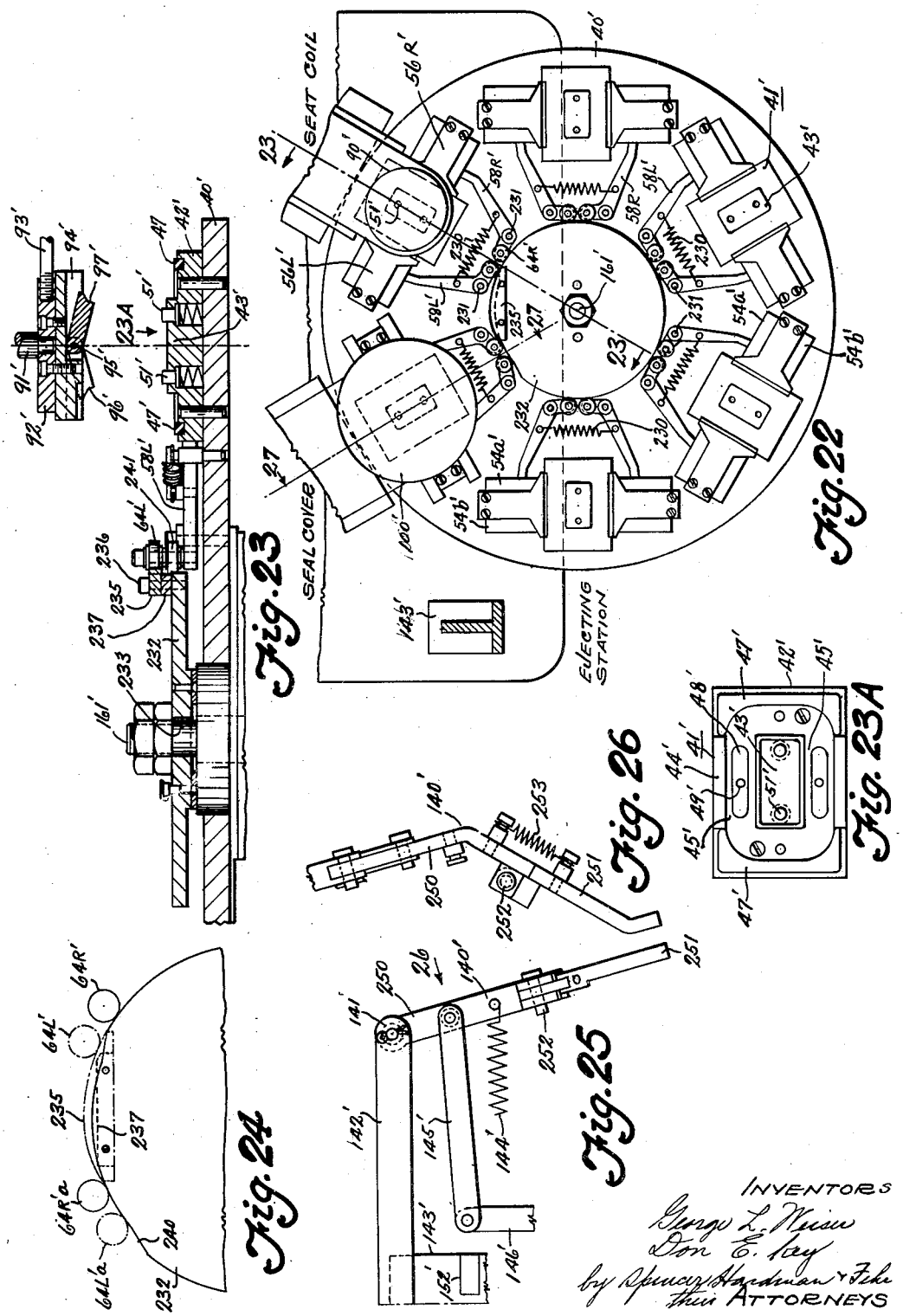

Oct. 11, 1949.  G. L. WEISER ET AL  2,484,600
APPARATUS FOR COVERING ELECTRICAL COILS
Filed Oct. 29, 1948  9 Sheets-Sheet 8
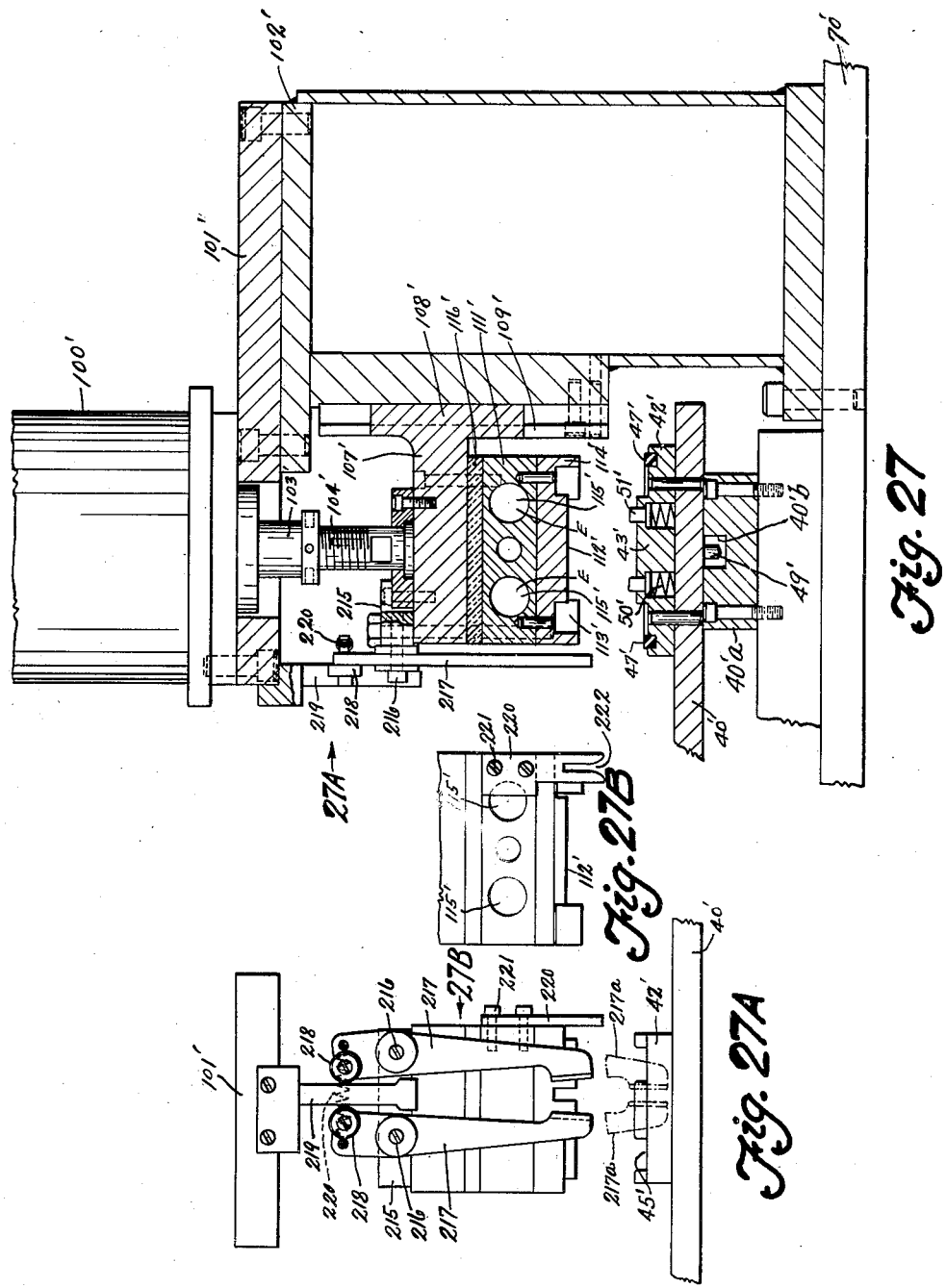
INVENTORS
George L. Weiser
and Don E. Key
by Spencer Hardman & Fehr
their ATTORNEYS

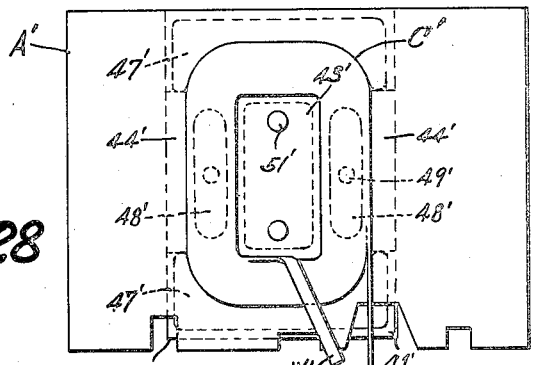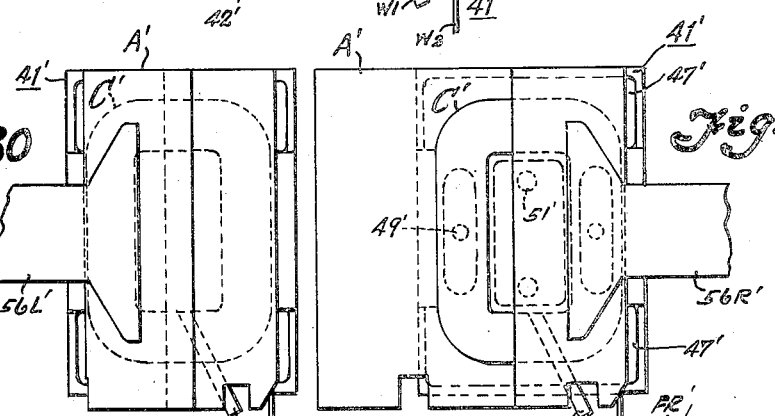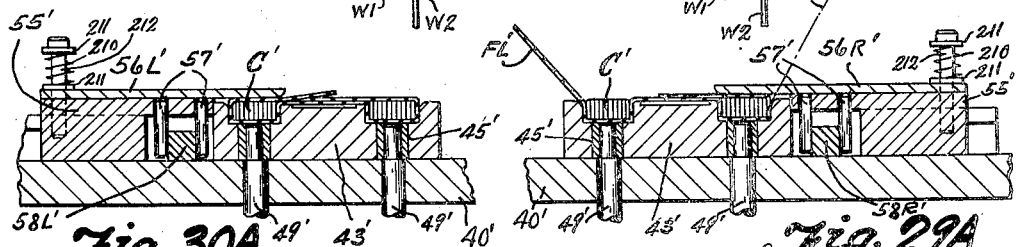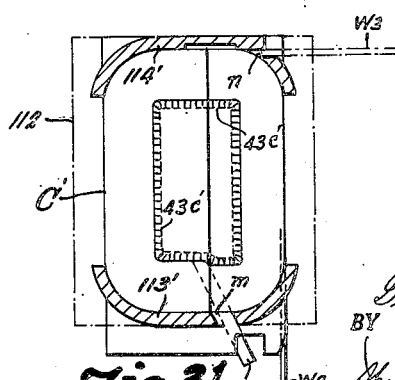

Patented Oct. 11, 1949

2,484,600

UNITED STATES PATENT OFFICE 2,484,600

APPARATUS FOR COVERING ELECTRICAL COILS

George L. Weiser, Middletown, and Don E. Key, Anderson, Ind., assignors to General Motors Corporation, Detroit, Mich., a corporation of Delaware Application October 29, 1948, Serial No. 57,216

8 Claims. (Cl. 154—41)

This invention relates to apparatus for covering electrical coils with sheet insulating material such as cloth.

An object of the invention is to provide a machine which wraps a piece of cloth around an electrical coil and which seals the cloth by imparting heat to a layer of sealing material with which the cloth is coated. In the disclosed embodiments of this invention there is a dial carrying a plurality of supports or workholders each adapted to receive a sheet with coated side up and a coil which at one station of the dial is centered with respect to the workholder and is pressed firmly against the cloth so that a middle portion thereof extends across the space which the coil surrounds leaving portions of the cloth extending beyond opposite side portions of the coil to provide flaps which are folded consecutively upon the coil by devices, which operate while the coil is passing from the coil positioning station to the cloth sealing station. At the sealing station, a heated iron is caused to descend to seal the overlapping flaps at the ends of the coil and to seal the cloth adjacent the inside of the coil. The coil with the cover sealed thereon passes to a station where the coil is ejected. The unsealed central portion of the cloth is punched out by a separate punch press so that the coil is in condition for mounting on the core of an electromagnet. As disclosed in the accompanying drawings, the present invention is adapted for use in covering field coils for generators and motors.

Further objects and advantages of the present invention will be apparent from the following description, reference being had to the accompanying drawings, wherein preferred embodiments of the present invention are clearly shown.

In the drawings:

Fig. 1 is a plan view of the machine as adapted for covering generator fields coils.

Fig. 2 is a fragmentary sectional work on a larger scale than Fig. 1 and is taken on line 2—2 of Fig. 1.

Fig. 2A is a view in the direction of arrow 2A of Fig. 2.

Fig. 3 is drawn to the same scale as Fig. 2 and is a sectional view on line 3—3 of Fig. 1.

Figures 11, 12:
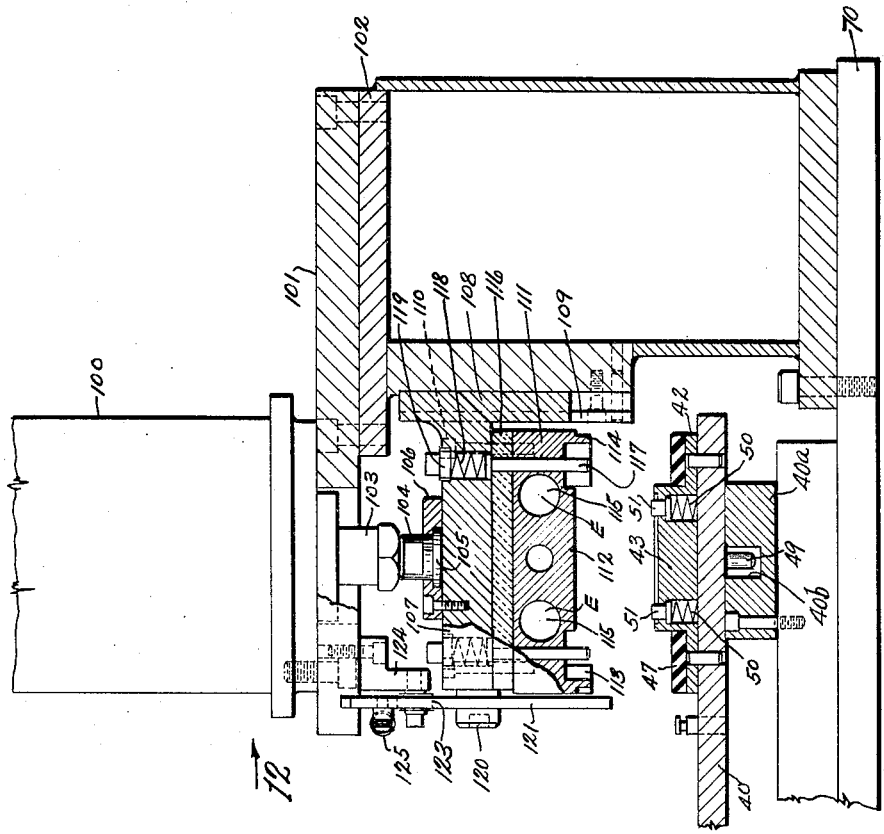

Figs. 4 and 5 are fragmentary sectional views taken respectively on lines 4—4 and 5—5 of Fig. 3.

Fig. 6 is a longitudinal sectional view showing the dial locking apparatus.

Fig. 7 is a fragmentary sectional view on line 7—7 of Fig. 6.

Fig. 8 is a fragmentary plan view of the machine and is drawn to a larger scale than Fig. 1.

Figs. 9 and 10 are fragmentary sectional views taken respectively on lines 9—9 and 10—10 of Fig. 8.

Fig. 11 is a fragmentary sectional view on lines 11—11 of Figs. 1 and 8.

Fig. 12 is a view in the direction of arrow 12 of Fig. 11.

Fig. 13 is a plan view of the ejecting machine which is omitted from Fig. 1 for sake of clearness.

Fig. 14 is a view in the direction of arrow 14 of Fig. 13.

Fig. 14A is a view of cam 130 in the direction of arrow 14A of Fig. 13.

Figs. 15 and 16 are sectional views taken on lines 15—15 and 16—16 respectively of Fig. 13.

Fig. 17 is a sectional view on line 17—17 of Fig. 16.

Fig. 18 is a view showing the cloth and coil upon the workholder.

Fig. 19 shows the one flap folded over the coil.

Fig. 19A is a sectional view showing the apparatus for placing the flap as shown in Fig. 19.

Fig. 20 is a view showing the other flap folded on the coil.

Fig. 20A shows a section of the apparatus for folding over the left flap of the coil.

Fig. 21 shows the coil wrapped as in Fig. 20 and, in section, the iron which seals the end portions of the wrapping.

Fig. 22 is a fragmentary plan view of a machine similar to that shown in Fig. 1, but adapted for folding a cloth cover and sealing the same about a motor field coil.

Fig. 23 is a fragmentary sectional view on line 23—23 of Fig. 22.

Fig. 23A is a plan view of a workholder as viewed in the direction of arrow 23A of Fig. 23.

Fig. 24 is a diagram of the cams which effect operation of the cloth folding mechanisms shown in Figs. 22 and 23.

Fig. 25 is a fragment of the ejector mechanism used with the machine shown in Fig. 22 and shows particularly the ejector lever 140' which is used in place of lever 140 of Fig. 14.

Fig. 26 is a view in the direction of arrow 26 in Fig. 25.

Fig. 27 is a fragmentary sectional view on line 27—27 of Fig. 22.

Fig. 27A is a view in the direction of arrow 27A of Fig. 27.

Fig. 27B is a view in the direction of arrow 27B of Fig. 27A.

Figs. 28, 29, 29A, 30, 30A and 31 are views similar, respectively, to Figs. 18, 19, 19A, 20, 20A and 21 and showing the operations of wrapping and sealing the cloth on a motor field coil.

A dial 40, Fig. 1, supports a plurality of workholders 41, each comprising a plate 42 (Figs. 16 and 17) from which there extends upwardly a central boss 43 adapted to fit within the space which the coil surrounds and ribs 44 thus providing recesses 45 which the sides or longer portions of the coil C in Fig. 18 will fit. The central boss 43 is surrounded by a pad 47 of hard rubber against which the outer surface of the cloth covering is to be located. The plate 42 provides openings which receive ejector bars 48 each connected with an operating pin 49 which is lifted by means to be described in order to move the coil with its covering above the level of the top of the central boss 43. Boss 43 contains springs 50 which force upwardly pins 51 for applying pressure to the cloth portion which extends between the sides and ends of the coil.

With each workholder 42 there are associated bars 54a and 54b attached to dial 40 and providing guides for slides 55 each carrying a cloth flap folding bar 56 and two pins 57 receiving between them an end of a lever 58. Each bracket 54a supports a leaf spring 59 which urges a pin 60 against the slide 55, thereby applying thereto friction sufficient to retain the slide either in its normal position or in an operating position.

Since the cloth folding blades 56 operate at different times they are hereinafter designated as 56R and 56L, one being at the right and the other at the left of the workholder as viewed in Fig. 8. Their respective operating levers 58 are designated 58R and 58L.

Referring to Fig. 10, lever 58R is supported by dial 40 and is rotatable about a screw 61 which passes through a bushing 62 common to lever 58R and to a lever 63R carrying a roller 64R adapted to engage a camming surface 65 of an arcuate bar 66 which, as shown in Fig. 9, is supported by a bracket 67 attached to a plate or table 70.

Referring to Fig. 9, lever 58L is supported by the dial 40 and is pivoted on a screw 71 threaded into the dial 40 and passing through a bushing 72 common to the lever 58L and a lever 63L connected with lever 58L and carrying a roller 64L adapted to engage the camming surface 72 of an arcuate bar 73 also supported by bracket 67 and secured thereto by screws 74 passing through bars 73 and 66 and an intermediate spacer 75. Bar 66 is also supported by a plate 76 fixed to a bracket 86. Bars 73 and 66 are supported also by a bracket 102a attached to a bracket 102.

The workholders move counterclockwise with the dial as viewed in Fig. 8. Roller 64R engages the cam surface 65 of bar 66 before roller 64L engages the cam surface 72 of bar 73. Therefore the folding blade 56R will move toward the boss 43 in advance of movement of blade 56L toward said boss. When the workholders arrive at the position represented by the workholder which is the left hand one in Fig. 8, both of the folding bars have moved in. After the workholder moves from that position, arm 58x (Fig. 8) is engaged by a cam 77 attached to a bracket 78 attached to the table 70, thereby causing the folding blades to be retracted from the boss 43. In order to be sure that the folding blades are retracted at the time the workholder moves into the position represented by the right hand end (Fig. 8) an arm 58x of each of the levers 58L or 58R is caused to engage a cam 80 attached to a bracket 81 supported by table 70.

At the station marked "load cloth" (Fig. 1) a piece of cloth A (Fig. 18) is placed upon the workholder. The piece of cloth is preferably provided with holes which, when the cloth is in proper position, will receive the pins 51, the side of the cloth which is coated with a piece softened with plastic adhesive being uppermost. When the dial is indexed to the "load coil" station, the coil C is placed upon the cloth as indicated in Fig. 18. At the idle station no work is performed. At the next station, the coil is seated in the workholder and the central portion of the cloth is caused to surround the upper portion of the plate 43 as shown in Fig. 19A and the side flaps of the cloth are caused to bend upwardly due to engagement with the bosses 44 as indicated at the right by dot-dash lines FR indicating the position of the right flap and indicated on the left by flap FL, a fragment of which appears in Fig. 19A.

The apparatus which seats the coil C is shown in Fig. 2. It comprises bracket 86 attached to table 70 and includes a cross plate 87 having a vertically extending notch 88. The bracket supports a horizontal plate 89 which supports a cylinder 90 into the top of which compressed air is introduced at the proper time to cause a piston rod 91 to move down, the bottom of cylinder 90 being vented. To cause rod 91 to move up, the connections with the cylinder are reversed. Rod 91 carries a plate 92 from which extends a screw 93 received by notch 88, thereby preventing rotation of plate 92. Plate 92 supports a plate 94 carrying a pin 95 which supports oppositely extending levers 96 and 97 which take the position shown in Fig. 2 by gravity. These levers are respectively received by grooves 98 and 99 respectively provided by the plate 94. The cloth which is placed upon the workholder is represented by the dot-dash line Cx in Fig. 2. When the coil is placed thereon it is supported by the cloth to an extent such that most of the coil is above the top surface of the workholder boss 43. During the lowering of the plate 94, the levers 96 and 97 engage the inner surfaces of the ends of the coil and center it with respect to the block 43 and the plate 94 engages the coil to force it together with the cloth around the block 43 and against the rubber pad 47. Then the application of pressure fluid above the piston in cylinder 90 is relieved so that a spring below the piston causes piston rod 91 to rise. The dial is indexed to carry the work into the cover sealing station indicated in Fig. 1. Before the work arrives at this station, the right and left hand flaps of the cover will have been folded upon the coil consecutively as indicated in Figs. 19, 19A, 20 and 20A.

The apparatus at the sealing station comprises a pressure fluid cylinder 100 supported by a plate 101 supported by a bracket 102 supported by the table 70. Cylinder 100 contains a piston connected with a rod 103 to which is attached a screw 104 having a flanged head 105 which a flanged disc 106 secures to a bracket 107 integral with a vertically movable slide 108 and is guided for such vertical movement by rails 109 secured to bracket 102. Screws 110 secure to the bracket 107 an iron 111 having a central boss 112 and end bosses 113 and 114 and heated by electrical heating elements E located in holes 115 in the iron 111. A heat insulating plate 116 is located between the iron 111 and bracket 107. Iron 111 and plate 116 are provided with aligned holes through which extend pins 117 which are urged downwardly by springs 118 retained by screw plugs 119, the heads of said pins resting upon the plate 116.

To the bracket 107 are attached screws 120 pivotally supporting levers 121 having cam surfaces 122 engageable with rollers 123 pivotally supported by a bracket 124 by a plate 101, a spring 125 connecting the levers 121 urging them against the rollers 123.

After the work has been indexed into the sealing station, pressure fluid is admitted to the upper end of cylinder 100 and causes the iron 111 to descend. During its descent, the levers 121 move down and then apart as indicated at 121' in order to spread the wires W (Fig. 18) unless they are not already in close proximity to the folds of the cloth. As viewed in Fig. 21, upper edge positions of the folded cloth are engaged by iron boss 114 and the lower edges by iron boss 113 in order to seal these cloth portions together, and the central iron boss 112 forces the cloth portions extending between the sides and ends of the coil against a bead 43b provided by the block 43, thereby sealing the cloth at the area 43c represented by the horizontal and vertical lines in Fig. 21. Following this operation, compressed air is admitted to the lower end of cylinder 100 while its upper end is vented to cause the iron to return to normal position.

The work is then indexed to the ejecting station indicated in Figs. 1 and 13. During this indexing movement, the pins 49 (Fig. 16) engage a cam 130 (Figs. 14 and 14A) attached to a bracket 131 supported by table 70, thereby moving the pins to positions 49x and the bars 48 to the positions 48x, thereby elevating the coil to position Cy. Ejection of the coil C toward the left from the position shown in Fig. 14 is effected by a lever 140 pivotally supported at 141 by a bar 142 attached to a bracket 143 attached to table 70. The ejecting movement of lever 140 is effected by a spring 144 which is prevented from the ejecting operation by virtue of the connection of lever 140 with a link 145 connected with a lever 146 pivoted at 147 upon the bracket 143 and carrying a roller 148 which is normally engaged by a ring 149 providing as many notches 150 as there are workholders. During the initial part of the indexing from the ejecting station, the roller 148 drops into a notch 150 under the action of spring 144 which causes lever 140 to engage the coil at Cy and remove it from the workholder. Following this operation, a rise 151 in the cam ring 149 engages the roller 148 to restore the lever 140 to normal position and to stress the spring 144 preparatory to the next ejecting operation. The ejecting movement of lever 140 is limited by engagement of link 145 with a lug 152 of bracket 143.

The indexing of the dial 40 can be effected by any suitable mechanism for example as disclosed in Holmes Patent #1,994,995 granted March 19, 1935. A form of this mechanism is shown in Figs. 3–7. A table 70 supports a gear housing 160 which supports a stud 161 which extends through a thrust bearing washer 162 and a bearing bushing 163 which is fitted into the hub 164 of dial 40 secured to the hub by screws 141. Nuts 165 threaded on the stud retain a disc 166 to which pins 167 secure a bearing washer 168 lubricated by an oiler 169. The hub 164 is provided with six radially extending notches 170 each adapted to receive a roller 171 journaled on a pin 172 attached to a disc 173 attached to a shaft 174 journaled in a plain bearing 175 attached to the housing 160 and in a ball bearing 176 supported by a cover 177 on the housing. Shaft 174 is connected by a worm wheel 178 with a worm gear 179 connected with a shaft 180 to which a driving pulley 181 is driven in any suitable manner. In order to lock the dial when it has located the workholder at the various stations, the disc 173 is provided with a cam 185 which engages a roller 186 pivotally supported by a rod 187 integral with a hub 188 attached to a pin 189 guided for vertical movement by a bushing 190 and a bushing 191. The roller 186 is maintained in engagement with the cam 185 or with disc 173 by a spring 192 confined in a recess of the pin 189 and bearing against a cap 193 attached to housing 160. Rotation of rod 189 is prevented by the engagement of a lug 194 extending from hub 188 into a notch 195 provided by a cap 196 attached to housing 160.

Following indexing movement, the cam 185 will have left the roller 186 to permit the spring 192 to move the pin 189 upwardly into engagement with the one of the six hardened metal bushings 197 with which the dial hub 164 is provided. As soon as the dial is thus locked, a cam 200 driven by shaft 174 and retained thereon by a nut 201 engages a roller 202 of the operating plunger 203 of a valve 204 attached to a bracket 205 supported by table 70. When this roller 203 is forced toward the right from the position shown in Fig. 3, pressure fluid is admitted simultaneously into the upper ends of cylinders 90 and 100 while their lower ends are vented so that the operations of coil seating and cloth sealing will be provided simultaneously. Before indexing starts again, this valve is operated by a spring not shown so that the connections with these cylinders are reversed and the pistons in these cylinders will return to upper position.

Figs. 22–31 show the differences between the previously described machine for covering generator field coils and a machine for covering motor field coils. In these figures the parts which correspond and function to parts of the first machine are identified by the same reference numbers with the primes affixed. Instead of the cloth folding plates 56R and 56L (Figs. 19A and 20A) which are rigidly anchored to the slides 55 and which are shaped to provide flexibility, the folding blades 56R' (Fig. 29A) and 56L' (Fig. 30A) are blades of uniform thickness and they are urged against their respective slides 55' by springs 210 located between washers 211 and surrounding a screw 212 passing through the washers and spring and connected with the slide 55'. Instead of a rubber pad 47 extending entirely around the central boss 43 as shown in Figs. 13 and 16, there are two pads 47' located against the opposite smaller ends of the pad 43'. The field coil C' is made of relatively stiff bar wire having terminals W1 and W2. The piece of cloth A' is notched in order to provide access to these terminals after the cloth is folded around the form. The sealing iron 113' (Fig. 31) is notched at m to provide clearance for wire W1 which extends over the top surface of the coil as shown in Fig. 28. In case the coil C' has its lead wire W2 located at W3 (Fig. 31), iron 114' has a notch n to receive it. In order to be sure that lead W1 is located properly with respect to the notches in the cloth A', a mechanism shown in Figs. 27 and 27A is provided. Bracket 107' supports a plate 215 to which are attached screws 216 pivotally supporting levers 217 supporting rollers 218 urged against a cam bar 219 by a spring 220 which connects the levers 217. During descent of the frame 107', rollers 218 engage the lower enlarged end of bar 219 thereby causing the levers 217 to move to positions 217a in Fig. 27A. In these positions, the levers engage lead W1 in order to position it correctly if it is not already in the correct position. To locate lead wire W3 properly to be received by notch n in iron 114', a plate 220, secured by screws 221 to iron heater block 112', has a notch 222 which receives wire W3.

The procedure of placing the cloth A' and then the coil C' upon the workholders, seating the coil, folding the cloth and sealing the cloth with heated irons, as indicated by Figs. 28-31, is the same as previously described with respect to Figs. 18-21.

Because the motor field coil is made of relatively stiff bar wire and the surface over which the cloth is folded might not be perfectly flat and might present an obstruction to movement of the folding plates, the actuation of these plates for purpose of safety, is effected by a spring 230 which as shown in Fig. 22 connects the levers 58R' and 58L' which are pivoted at 231 upon the dial 40'. Roller 64R' attached to lever 58R' follows the contour of a cam 232 which, as shown in Fig. 23, is connected by a key 233 with stud 161' about which the dial 40' rotates. A portion of the contour of cam 232 is shown in full lines in Fig. 24 and the out and in positions of rollers 64R' are shown by dot-dash circles marked by 64R' and 64R'a respectively. Lever 58L' (Fig. 23) carries a roller 64L' which is controlled by a cam 235 indicated by dot-dash lines in Fig. 24. The out position of roller 64L' is indicated by a dot-dash circle so marked in Fig. 24; and the in position of this roller is indicated by the dot-dash circle marked 64L'a. As the lever rollers are passed in a counterclockwise direction about the fixed cams, lever 58R' moves counterclockwise prior to clockwise movement of lever 58L' under the action of spring 230 to effect the folding operations. The cam 235 is attached to a cam 232 by screws 236 (Fig. 23) and is spaced therefrom by a plate 237 which is indicated in dotted lines in Fig. 24. The retraction of the folding plates is effected by cam 232 having a rise 240 engaged by roller 64R' and by a roller 241 (Fig. 23) carried by a lever 56L' and located below roller 64L'.

The ejecting lever 140' which corresponds with lever 140 (Fig. 14) is made in two parts 250 and 251 pivotally connected at 252 and connected by a spring 253 which urges part 251 into the position shown in Fig. 26. If part 251 meets with an obstruction it can turn clockwise relative to part 250 as viewed in Fig. 26, the spring 253 yielding to permit such movement.

As shown in Fig. 2, vertically below the cylinder 90 there is located between the dial 40 and the table 10 a block 40a which transmits to the table from the dial the force applied to the workholder by plate 94 when forced downwardly by the piston in cylinder 90. Block 40a has a groove 40b to provide clearance for the ejector pins 49. For a similar purpose, the block 40a is located as shown in Fig. 11. The machine for covering motor field coils has similar blocks, one being indicated at 40'a in Fig. 27 and having a groove 40'b providing clearance for ejector pins 49'.

While the embodiments of the present invention as herein disclosed, constitute preferred forms, it is to be understood that other forms might be adopted.

What is claimed is as follows:

1. A machine for covering a flat coil with a piece of cloth coated on one side with a heat softenable plastic comprising a work holder having a central boss adapted to receive the coil which surrounds the boss when the coil is seated upon the work holder and having ribs spaced from the boss and extending respectively along opposite outer side edges of the coil when seated, the cloth being placed upon the boss with coated side up and the coil being placed upon the cloth and seated upon the work holder whereby the central portion of the cloth is caused to be located upon the top surface of the boss of the work holder and between the side surfaces of the boss and the inner surface of the coil and whereby the portions of the cloth which extend from its central portion are located between the bottom of the coil and the work holder and between outer side edges of the coil and the adjacent ribs of the work holder, the unconfined portions of the cloth providing flaps extending from the ribs of the work holder, means for folding the flaps successively upon the coil and upon the cloth portions overlying the boss, and means for applying heat to the cloth portions extending beyond the outer end edges of the coil and to the cloth portion overlying the boss in order to effect adherence of said cloth portions.

2. A machine according to claim 1 further characterized by coil-seating apparatus which effects accurate location of the coil relative to the boss and which then forces the coil and cloth around the side surfaces of the boss.

3. A machine according to claim 1 further characterized by a conveyor and a plurality of the described work holders moved by the conveyor, there being flap-folding means associated with each work holder, means for indexing the conveyor to effect movement of the work holders successively to a loading station and a cloth-sealing station where the heat applying means is located, a mechanism which in response to movement of the conveyor effects operation of the flap-folding means associated with a work holder prior to its arrival at the cloth-sealing station, a mechanism for driving the conveyor indexing means and means controlled by said mechanism for causing operation of the heat applying means while the conveyor is stationary.

4. A machine according to claim 1 further characterized by a conveyor and a plurality of the described work holders moved by the conveyor, there being flap-folding means associated with each work holder, means for indexing the conveyor to effect movement of the work holder successively to a loading station to a coil-seating station and to a cloth-sealing station where the heat-applying means is located, apparatus at the coil-seating station which effects arcuate location of the coil relative to the boss and which then forces the coil and cloth around the side surfaces of the boss, a mechanism which in response to movement of the conveyor effects operation of the flap-folding means associated with a work holder as it moves between the coil-seating and the cloth-sealing stations, a mechanism for driving the conveyor indexing means and means controlled by said mechanism for causing operation of the coil-seating and cloth-sealing means while the conveyor is stationary.

5. A machine according to claim 1 further characterized by a conveyor dial, a plurality of the described work holders supported by the dial, flap-folding means associated with each work holder and comprising two flap-folding plates movable across the top of the coil and levers respectively connected with the plates, cam followers respectively connected with said levers, and fixed cams which control movements of the levers for the flap-folding operation by said plates prior to arrival of the associated work holder at the cloth-sealing station where the heat applying means is located and movement of the levers to retract the plates after the work holder moves past the cloth-sealing station, and means for indexing the conveyor.

6. A machine according to claim 1 further characterized by a conveyor dial, a plurality of the described work holders supported by the dial, means for lifting the covered coil relative to the work holder and comprising members engaging the under side of the covered coil and cam followers connected therewith and a fixed cam engaged by the followers after the work holder passes the cloth-sealing station, and means for indexing the conveyor.

7. A machine according to claim 1 further characterized by a conveyor dial, a plurality of the described work holders supported by the dial, means for lifting the covered coil relative to the work holder and comprising members engaging the under side of the covered coil and cam followers connected therewith and a fixed cam engaged by the followers after the work holder passes the cloth-sealing station, means at an ejecting station for moving the lifted coil edgewise from the work holder and means for indexing the conveyor.

8. A machine according to claim 1 further characterized by a conveyor dial, a plurality of the described work holders supported by the dial, means for lifting the covered coil relative to the work holder and comprising members engaging the under side of the covered coil and cam followers connected therewith and a fixed cam engaged by the followers after the work holder passes the cloth-sealing station, means at an ejecting station for moving the lifted coil edgewise from the work holder and comprising a lever for engaging the coil to eject it, a cam follower connected with the lever, a cam moving with the dial and engaging the follower to move the lever into position preparatory for coil-ejection, a spring opposing said lever movement, said cam having a contour such that, upon location of a work holder at the ejecting station, the spring is released to cause coil-ejecting movement of said lever, and means for indexing the conveyor.

GEORGE L. WEISER.
DON E. KEY.

REFERENCES CITED

The following references are of record in the file of this patent:

UNITED STATES PATENTS

| Number | Name | Date |
|---|---|---|
| 720,081 | Taylor | Feb. 10, 1903 |
| 1,537,697 | Roberts | May 12, 1925 |
| 1,595,838 | Turner | Aug. 10, 1926 |
| 1,777,231 | Shepard | Sept. 30, 1930 |
| 1,864,331 | Whitesmith | June 21, 1932 |